United States Patent [19]

Sury

[11] Patent Number: 5,242,580
[45] Date of Patent: Sep. 7, 1993

[54] RECOVERY OF HYDROCARBONS FROM HYDROCARBON CONTAMINATED SLUDGE

[75] Inventor: Kohur N. Sury, Calgary, Canada

[73] Assignee: Esso Resources Canada Limited, Calgary, Canada

[21] Appl. No.: 844,971

[22] Filed: Mar. 2, 1992

Related U.S. Application Data

[63] Continuation of Ser. No. 623,846, Dec. 7, 1990, abandoned.

[51] Int. Cl.$^5$ .................. C10G 1/00; B01D 21/00; B09B 1/00
[52] U.S. Cl. .................. 208/400; 208/425; 210/703; 210/788; 405/128
[58] Field of Search ............ 208/400, 425; 210/703, 210/788; 134/25.1; 405/128

[56] References Cited

U.S. PATENT DOCUMENTS

| | | | |
|---|---|---|---|
| 4,172,025 | 10/1979 | Porteous et al. | 208/391 |
| 4,282,103 | 8/1981 | Fuhr et al. | 208/391 |
| 4,392,941 | 7/1983 | Roth et al. | 208/391 |
| 4,545,892 | 10/1985 | Cymbalisty et al. | 208/425 |
| 4,859,317 | 8/1989 | Shelfantook et al. | 208/425 |

FOREIGN PATENT DOCUMENTS

841581 5/1970 Canada .................. 208/391
1094483 1/1981 Canada .

OTHER PUBLICATIONS

*Athabasca Tar Sands,* by L. R. Pitt; Department of Mineral Engineering, University of Alberta, Canada, pp. 374–377.

Primary Examiner—Theodore Morris
Assistant Examiner—P. L. Hailey
Attorney, Agent, or Firm—Arne I. Fors

[57] ABSTRACT

A process is disclosed for the removal of hydrocarbons such as bitumen or heavy fuel oil from hydrocarbon contaminated sludge, or particulate solid material or the like non-homogenous material after appropriate conditioning, such as by ball milling, with the conditioned material being aerated and then fed substantially tangentially into a substantially vertical cyclonic separator vessel to cause the hydrocarbons to which air bubbles have become attached to tend to float as a froth to the top of the vessel, with the remaining solids sinking to the bottom of the vessel. The hydrocarbon containing froth is then removed from the top of the vessel, and the remaining solids removed from the bottom of the vessel. This pneumatic flotation process obviates the need to add chemicals such as wetting agents or promoters.

6 Claims, 2 Drawing Sheets

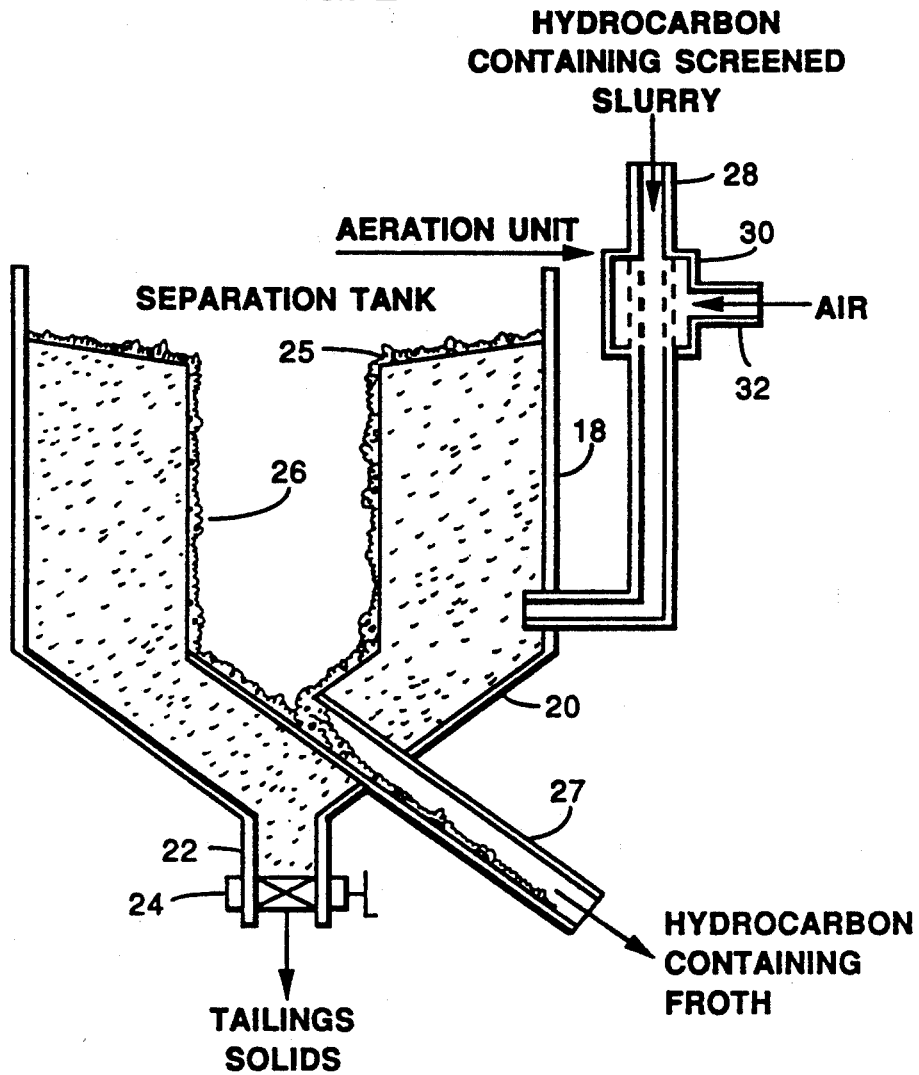

RECOVERY OF HYDROCARBONS FROM HYDROCARBON CONTAMINATED SLUDGE

This application is a continuation of application Ser. No. 623,846 filed Dec. 7, 1990, now abandoned.

BACKGROUND OF THE INVENTION

This invention relates to the recovery of hydrocarbons from hydrocarbon contaminated sludge or particulate solid material, for example the recovery of bitumen from bitumen contaminated earth.

In the extraction of bitumen from tar sands, also known as oil sands or bituminous sands, it is well known to use water extraction processes such as a cold water process or a hot water process, a hot water process being commercialized. One of the end products of such processes, in addition to the desired bitumen concentrate, is bitumen contaminated tailings. For various reasons, it is desirable to recover bitumen from such tailings. A process for this purpose is described in U.S. Pat. No. 4,392,941 (Roth et al) issued Jul. 12, 1983, the contents of which are hereby incorporated herein by reference. Roth et al teach a process in which the tar sands sludge, having the bitumen liberated from the tar sand solids, is diluted with water and subjected to high-shear agitation and aeration. The treated sludge is then allowed to settle under gravity to obtain an upper bitumen containing froth layer and a lower sludge layer of reduced bitumen content. Additives can be added to facilitate separation of the bitumen. The Roth et al process is particularly intended for the recovery of bitumen from sludge in a tailings pond to which tailings of a narrow and uniform solid size range from a water extraction process has been fed.

It is also interesting to note the teaching in U.S. Pat. No. 4,410,417 (Miller et al) issued Oct. 18, 1983, the contents of which are also incorporated herein by reference, which is concerned with the problem of separating high viscosity bitumen from tar sands. The teaching of Miller et al is to grind the tar sand to obtain phase disengagement of the bitumen phase from sand phase, and thereafter use flotation techniques to obtain phase separation of the bitumen phase from the sand phase. Phase disengagement is assisted by the use of a suitable wetting agent during the crushing step, while the phase separation step is assisted by the use of a promoter oil in a flotation step. The flotation step is conventional mechanical flotation and involves the attachment of air bubbles to the hydrophobic surface of the bitumen particles.

However, there is also a need for a process to recover bitumen from bitumen contaminated waste comprised essentially of coarse sand, fine sand, clay, gravel or mixtures thereof of a wide variety and range of sizes. Such waste may for example be used drilling mud from an oil well or sand which has been used to mop up an oil spill at an oil production site. Bitumen contaminated drilling mud will ordinarily consist primarily of clay, and bitumen contaminated mop-up sand will of course consist primarily of sand. In both cases, the other solids mentioned above may also be present, and all may be coated with bitumen. Such bitumen contaminated material previously was used to stabilize road surfaces, but for environmental reasons such use is no longer permitted in many areas.

Similarly, there is also a need for a process to recover heavy fuel oil such as Bunker C from oil-contaminated earth, which comprises clay and/or sand compounds, such contamination occurring for example as a result of leakage of fuel oil from a storage tank into the surrounding soil. It is known that such events occur from time to time at locations such as fuel storage stations and possible environmental problems resulting from such leakages are self-evident.

Furthermore, as evidenced by the recent oil spill in Alaska from the oil tanker Valdez, there is also a need for a process to recover heavy fuel oil which has been spilled at sea and has subsequently been washed up on a beach to contaminate the sand thereof.

The teaching of the prior art, such as that referred to above, does not suggest a solution to the problem mentioned above of recovering hydrocarbons from such man-made non-homogenous hydrocarbon-contaminated material.

SUMMARY OF THE INVENTION

It has now been discovered that hydrocarbons such as bitumen or heavy fuel oil can be removed from such non-homogenous material after appropriate conditioning, such as by ball milling, with the conditioned material being aerated and then fed substantially tangentially into a substantially vertical cyclonic separator vessel to cause the hydrocarbons to which air bubbles have become attached to tend to float as a froth to the top of the vessel, with the remaining solids sinking to the bottom of the vessel. The hydrocarbon containing froth is then removed from the top of the vessel, and the remaining solids removed from the bottom of the vessel. Such pneumatic flotation contrasts of course with conventional flotation in which mechanical action, usually by means of a rotating agitator, is used.

A particular advantage of this discovery is that it is not necessary to add chemicals (such as wetting agents or promoters) to achieve effective results, with the result that the end products are free from such chemicals and are therefore more acceptable.

BRIEF DESCRIPTION OF THE DRAWINGS

One embodiment of the invention will now be described, by way of example, with reference to the accompanying drawings, of which:

FIG. 2 is a diagrammatic sectional view of a cyclonic flotation vessel.

DESCRIPTION OF THE PREFERRED EMBODIMENT

Figure 1:
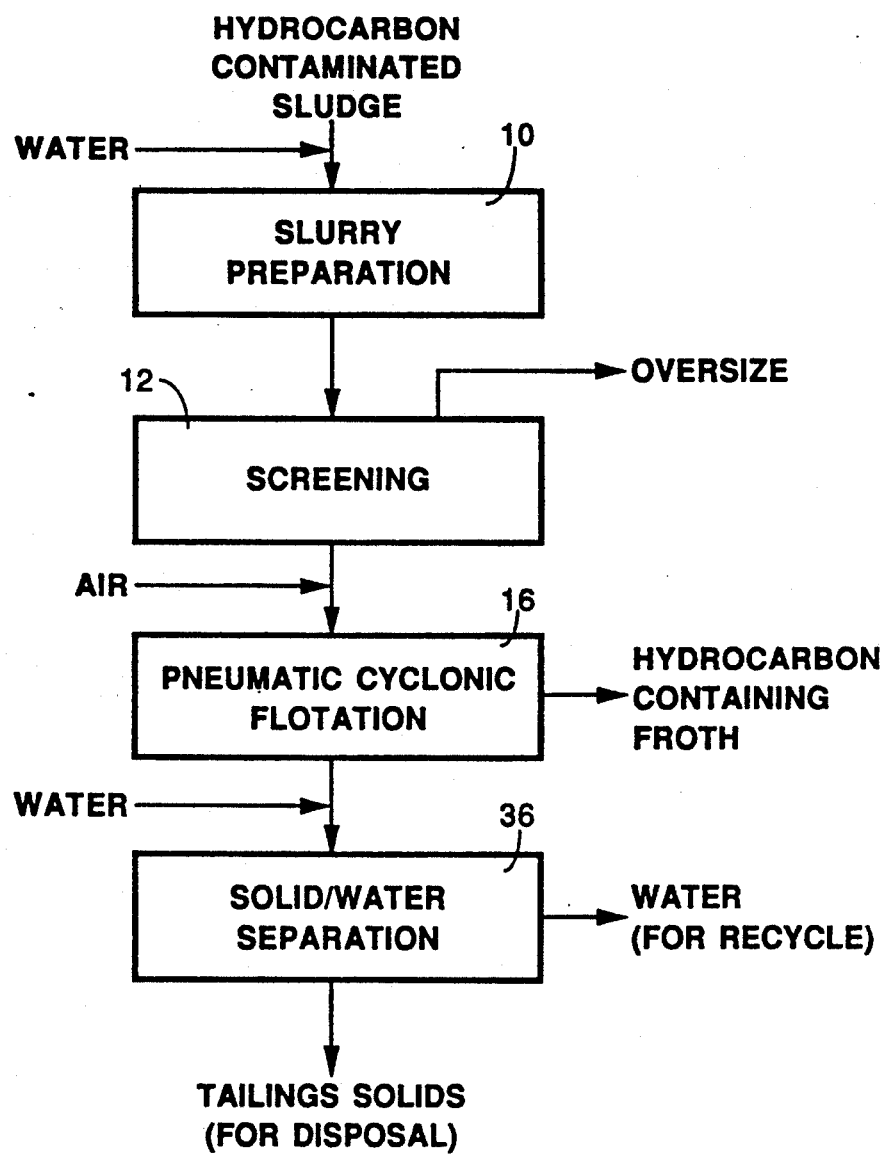
FIG. 1 is a schematic view of a process for recovering bitumen from bitumen contaminated sludge.

Referring to the drawings, and initially to FIG. 1, bitumen contaminated waste sludge and water are fed to a slurry preparation step 10. The sludge is bitumen-contaminated waste such as obtained from a heavy oil production site and contains coarse and fine sand, clay and gravel coated with bitumen. The sludge may contain up to about 20% by weight bitumen, up to about 10% by weight water, and the balance comprised of one or more of fine sand, clay and gravel. The coarse sand particles may range in size from about 0.5 mm to about 4 mm, the fine sand particles range in size from about 0.044 mm to about 0.5 mm, the clay is in micron sizes, and the gravel particles range in size from 4 mm to 50 mm. The amount of water added is not particularly critical, but is preferably such as to produce a resultant slurry with a solids content (pulp density) of about 30% by weight. However, a pulp density in the range of from about 30 to about 50% by weight solids would be suitable.

In the slurry preparation step 10, the slurry is subjected to mechanical action to disengage the bitumen phase from the solid phase and cause entry of the bitumen phase into the water phase. The actual nature of the mechanical action used will depend on the nature of the waste being treated. For example, with heavy hydrocarbons, such as bitumen as in this case, a tumbler may be used. However, the addition of metal grinding balls into the tumbler as grinding media may not be necessary if the sludge contains large (gravel) particles which will themselves function as grinding media, for example particles with a diameter greater than about 6 mm.

With heavy hydrocarbons, such as bitumen, it has been found advantageous to maintain a temperature in the slurry preparation step 10 (and in the pneumatic flotation step to be described) of at least about 50° C. For light hydrocarbon based sludges, ambient temperatures can be maintained.

The length of residence time in the slurry preparation step 10 is also not particularly critical, but would normally be of the order of from about 5 to about 10 minutes. The time may be greater or less than the optimum value depending upon the degree of hydrocarbon contamination being dealt with. As indicated earlier, the purpose of the slurry preparation step 10 is to disengage the bitumen phase from the solid phase and cause entry of the bitumen phase into the water phase.

Subject to the guide lines indicated above, the pulp density and residence time in the slurry preparation step 10 are not particularly critical, such flexibility in parameters being of course very advantageous. As also indicated earlier, it is not necessary to add chemicals such as wetting agents or promoter oil which may be undesirable in the bitumen end product if this is intended to be recycled to a bitumen extraction process.

The prepared slurry is then passed to a screening step 12 to remove particles with a size greater than about 4 mm. Such oversize material is relatively free from bitumen and can be disposed of in any convenient manner.

The screened slurry is diluted to less than 30% by weight solids by the addition of water and is then passed to a pneumatic cyclonic flotation step 14, which will be described with reference to FIG. 2 which shows a cyclonic separator vessel or cell 16. The vessel 16 is of circular horizontal section with a circular peripheral wall which has an upper cylindrical portion 18 and a lower conical portion 20 which tapers downwardly and inwardly to an outlet pipe 22 with discharge valve 24 through which tailings solids which have sunk to the bottom of the vessel 16 can be removed.

The vessel also has a centrally located froth discharge conduit 26 defining a central circular weir 27 which extends from a height near the top of the upper cylindrical vessel wall portion 18 centrally and downwardly through the vessel 16 to a laterally inclined discharge pipe 27 which exits from the vessel 16 near its lower end. The height of weir 25 can be adjusted, as necessary by adding ring sections, not shown.

Screened slurry from the screening step 12 is fed through an inlet pipe 28 with an aerator 30 having an air supply inlet 32 part way along its length, the inlet pipe 28 entering the vessel 16 adjacent the lower end of the cylindrical wall portion 18, i.e. just above the lower conical wall portion 20, to feed aerated slurry into the cyclonic separator 16 tangentially in a horizontal plane.

It has been found that the air in the aerated slurry attaches as air bubbles to the bitumen phase and causes the bitumen phase to float as a froth to the top of the slurry in the vessel 16, so that the froth passes into the centrally located discharge conduit 26 over circular weir 25 and leaves the vessel 16 through the discharge pipe 27. The solid phase, i.e. the sand, gravel and clay, sinks to the bottom of the vessel 16 from which it can be removed through the discharge pipe 22 by opening the discharge valve 24. The slurry level in the vessel 16 can of course be controlled by adjusting the slurry feed through feed pipe 28 and the solids discharged through discharge valve 24 so as to maintain the slurry level just below the top of the weir 25 of discharge conduit 26 and thereby cause the bitumen containing froth to overflow into the central discharge conduit 26. If desired the central discharge conduit 26 could be omitted and the froth caused to overflow into an outlet at the top of the cylindrical wall portion 18.

The pressure and flow rate of the air supplied to the aerator 30 through air supply inlet 32 is controlled to ensure that fine size air bubbles are produced to ensure that efficient flotation separation occurs.

In an actual test, slurry was fed through the inlet pipe 28 at a rate of 10 m$^3$/hr, air was fed through to the aerator 30 at a pressure of 50–70 psi and at a rate of 10 m$^3$/hr. The size of the air bubbles produced was 0.1 to 0.5 mm. Hydrocarbon containing froth left the discharge pipe 27 at the rate of about 2 m$^3$/hr. Tailings solids slurry were withdrawn through discharge valve 24 at the rate of 8 m$^3$/hr. The bitumen content in the feed was 10.1% by weight and the bitumen content in the tailing solids was 0.8% by weight.

Tests have found that practice of the invention in the manner described above can reduce the bitumen content of such waste from values in the range of from up to about 20% by weight to a value of about less than 1% by weight.

As mentioned earlier, the invention can also be used to remove heavy fuel oil from earth (i.e. soil) or sand which has been contaminated in a spill or leakage.

The tailings solid slurry can be dewatered by conventional techniques in solid/water separation 36 of FIG. 1 and stackpiled for disposal.

Other embodiments of the invention will be apparent to a person skilled in the art, the scope of the invention being defined in the appended claims.

I claim:

1. A process for recovering hydrocarbons from hydrocarbon contaminated sludge containing particulate solid material, said sludge comprising hydrocarbon wetted solid material selected from the group consisting of coarse sand, fine sand, clays, gravels and mixtures thereof, said process comprising adding water if necessary to said sludge containing particulate solid material to produce a slurry with a pulp density in the range of from about 30 to about 50% by weight solids, subjecting the slurry to mechanical action in a grinding medium in a slurry preparation step for a time sufficient to disengage the hydrocarbon from the solid material and cause entry of the hydrocarbon into a water phase, and removing oversize solids from the prepared slurry if necessary, diluting the slurry to less than 30% by weight solids by addition of water, aerating the diluted slurry to cause air bubbles to attach to the hydrocarbon and feeding the aerated slurry to a pneumatic cyclonic separation vessel having a rotating body of said slurry to cause the aerated slurry to enter said vessel substantially tangentially in a substantially horizontal plane into the rotating body of said slurry to cause the slurry in said vessel to circulate therein in a cyclonic manner with the hydrocarbon being floated by the attached air bubbles to form a froth on top of the slurry in the vessel and with the solids sinking to the bottom of the vessel, and, removing the hydrocarbon-containing froth from the top of the vessel and removing the essentially hydrocarbon-free solids from the bottom thereof.

2. A process according to claim 1 wherein the sludge contains up to about 20% by weight bitumen, up to about 10% by weight water, and the balance comprised of one or more of coarse sand with a size in the range from about 0.5 mm to about 4 mm, fine sand with a size in the range of from about 0.044 mm to about 0.5 mm, clay, and gravel with a size in the range of from about 4 mm to about 50 mm, and the essentially bitumen free-solid end product contains less than about 1% by weight bitumen.

3. A process according to claim 2 wherein the slurry is subjected to mechanical action in a tumbler having a grinding medium to disengage the bitumen phase from the solids phase.

4. A process according to claim 3 wherein said grinding medium is gravel to provide said mechanical action in the tumbler.

5. A process according to claim 2 wherein the slurry is maintained at a temperature of at least about 50° C. in the slurry preparation and flotation steps for heavy oil-based sludges and at ambient temperature for light oil based sludges.

6. A process according to claim 2 wherein the slurry is subjected to the preparation step for a time in the range from about 5 to about 10 minutes.

* * * * *